US 8,856,647 B2

Oct. 7, 2014

(12) United States Patent
Howell et al.

(54) FONT HANDLING FOR VIEWING DOCUMENTS ON THE WEB

(75) Inventors: Gareth Alan Howell, Bothell, WA (US); Zhenjun Zhu, Redmond, WA (US); Jie Tang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 398 days.

(21) Appl. No.: 12/389,389

(22) Filed: Feb. 20, 2009

(65) Prior Publication Data

US 2010/0218086 A1 Aug. 26, 2010

(51) Int. Cl.
*G06F 17/21* (2006.01)
*G06F 17/27* (2006.01)

(52) U.S. Cl.
CPC .................................. *G06F 17/214* (2013.01)
USPC ........... 715/269; 715/243; 715/248; 715/250; 715/255; 715/256; 715/264

(58) Field of Classification Search
USPC .......... 715/243, 248, 250, 255, 256, 264, 269
See application file for complete search history.

(56) References Cited

U.S. PATENT DOCUMENTS

| 5,528,742 A | | 6/1996 | Moore |
| 5,533,174 A | * | 7/1996 | Flowers et al. ............. 358/1.15 |
| 5,781,714 A | | 7/1998 | Collins et al. |
| 5,819,301 A | * | 10/1998 | Rowe et al. .................... 715/235 |
| 6,768,497 B2 | | 7/2004 | Baar et al. |
| 6,857,102 B1 | | 2/2005 | Bickmore et al. |
| 6,889,202 B2 | | 5/2005 | Johnson et al. |
| 7,155,672 B1 | * | 12/2006 | Adler et al. .................... 715/210 |
| 7,219,309 B2 | | 5/2007 | Kaasila et al. |
| 7,373,140 B1 | | 5/2008 | Matsumoto |
| 7,443,400 B2 | | 10/2008 | Matskewich et al. |
| 7,549,118 B2 | | 6/2009 | Andrey et al. |
| 2003/0095135 A1 | | 5/2003 | Kaasila et al. |
| 2004/0088657 A1 | | 5/2004 | Brown et al. |
| 2004/0266412 A1 | * | 12/2004 | Maes et al. ................. 455/414.4 |
| 2005/0080839 A1 | * | 4/2005 | Kuwata et al. ................ 709/200 |
| 2005/0193336 A1 | * | 9/2005 | Fux et al. ...................... 715/542 |
| 2005/0251735 A1 | * | 11/2005 | Dunietz et al. ................ 715/513 |
| 2005/0270553 A1 | * | 12/2005 | Kawara ......................... 358/1.13 |

(Continued)

FOREIGN PATENT DOCUMENTS

| CN | 1294459 A | 5/2001 |
| CN | 1809825 A | 7/2006 |

(Continued)

OTHER PUBLICATIONS

"International Search Report", Mailed Date: Aug. 30, 2010, Application No. PCT/US2010/021890, Filed Date: Jan. 22, 2010, pp. 8.

(Continued)

*Primary Examiner* — Stephen Hong
*Assistant Examiner* — Wilson Tsui
(74) *Attorney, Agent, or Firm* — Steve Crocker; Jim Ross; Micky Minhas (57) ABSTRACT

A request is received for a rendered document corresponding to a document. The document is retrieved from a storage device. The document is transformed into the rendered document. One or more server font files associated with the rendered document are generated. The rendered document and the server font files are stored.

15 Claims, 6 Drawing Sheets

(56) References Cited

U.S. PATENT DOCUMENTS

| | | | |
|---|---|---|---|
| 2006/0238787 A1* | 10/2006 | Foehr et al. | 358/1.11 |
| 2007/0006076 A1 | 1/2007 | Cheng | |
| 2007/0159646 A1 | 7/2007 | Adelberg | |
| 2007/0174291 A1* | 7/2007 | Cooper et al. | 707/10 |
| 2008/0028304 A1 | 1/2008 | Levantovsky | |

FOREIGN PATENT DOCUMENTS

| | | |
|---|---|---|
| JP | H096566 | 1/1997 |
| JP | 2002207723 | 7/2002 |
| JP | 2004501442 | 1/2004 |
| JP | 2004252005 | 9/2004 |
| JP | 2005217816 | 8/2005 |
| JP | 2005327150 | 11/2005 |
| JP | 2004252005 | 9/2014 |
| WO | WO 2010/096237 | 8/2010 |

OTHER PUBLICATIONS

Chinese Official Action dated Feb. 7, 2014 in Chinese Application No. 201080008860.X.

Australian Official Action dated Mar. 11, 2014 in Australian Application No. 2010216343.

Chilean Official Action dated Apr. 22, 2013 in Chilean Application No. 2019-11.

Chinese Official Action dated May 27, 2013 in Chinese Application No. 201080008860.X.

Chilean Official Action dated Sep. 4, 2013 in Chilean Application No. 1986-2011.

Japanese Official Action dated Sep. 3, 2013 in Japanese Application No. 2011-551088.

Chinese Official Action dated Oct. 9, 2012 in Chinese Application No. 201080008860.X.

Russian Official Action dated Apr. 23, 2014 in Russian Application No. 2011134909.

Japanese Official Action dated Jul. 2, 2014 in Japanese Patent Application No. 2011551088.

Russian Patent No. 2316814 C2 published Feb. 10, 2008 in the name of Braun et al. "Font Selection Method", Abstract only.

Russian Notice of Allowance dated Jul. 22, 2014 in Russian Application No. 2011134909.

* cited by examiner

FONT HANDLING FOR VIEWING DOCUMENTS ON THE WEB

BACKGROUND

Word processing and other authoring software applications may include a substantial library of fonts from which documents can be authored. A given document may include text formatted in one or more different fonts. These fonts may be stored in files that contain glyphs, characters, symbols, and a variety of other information for displaying text in a certain way. In order to properly display the document text, a document viewing application may need to access to the appropriate font files.

A web browser is a common tool for viewing documents shared over the World Wide Web ("web"). Conventional web browsers display documents authored in HyperText Markup Language ("HTML"). However, because HTML provides only limited document formatting capability as compared to conventional authoring applications, documents converted from their native format into HTML generally lose layout and other visual information. Thus, an HTML-converted document displayed on a web browser may look significantly different from the original document displayed on the authoring software application. Web browsers may also be capable of displaying additional document formats, such as ADOBE FLASH and MICROSOFT SILVERLIGHT.

Web browsers typically do not include font files. Thus, a web browser may need to obtain one or more font files prior to displaying a given document. However, these font files can be large, such as those for Latin languages, and even extremely large, especially for East Asian languages. Downloading large fonts can negatively affect document load time because the web browser is forced to wait until the necessary font files have been downloaded prior to displaying the document. Increased download times can cause significant frustration with users who desire on-demand viewing of documents.

It is with respect to these considerations and others that the disclosure made herein is presented.

SUMMARY

Technologies are described herein for providing improved font handling for viewing documents on the web. Unlike conventional approaches where large font files are transmitted to a web browser or other suitable document viewer in order to display a document, embodiments described herein reduce the amount of font data that a server transmits to the document viewer. The amount of font data may be reduced through local font files, a common font subset, and a per document font subset.

Local font files are font files that are already present in the computer executing the document viewer. If the document viewer is capable of displaying the document with only the local font files, then there is no need for the server to transmit additional font data to the web browser. The common font subset is a font file containing the most commonly-used fonts and characters. The common font subset is a reduced-sized file that can be utilized for multiple files. The common font subset can also be stored in the document viewer's cache. In this way, the common font subset can be utilized to display multiple documents without the need for the server to re-transmit the common font subset. The per document font subset is a document-specific font file that is created and provided to the document viewer when the document contains fonts that are not included in the common font subset. Fonts that are not included in the common font subset may be included in the per document font subset.

According to one embodiment, a method is provided herein for providing font files to a document viewer operating on a client computer. A request is received for a rendered document corresponding to a document. The document is retrieved from a storage device. The document is transformed into the rendered document. One or more server font files associated with the rendered document are generated. The rendered document and the server font files are stored.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all of the disadvantages noted in any part of this disclosure.

DETAILED DESCRIPTION

The following detailed description is directed to technologies for providing improved font handling for viewing documents on the web. Through the utilization of the technologies and concepts presented herein, document loading time can be reduced by eliminating the need to download entire font files and packages as is the case with conventional web document viewing scenarios. In particular, embodiments described herein may reduce document loading time through the use of local font files, a common font subset, and per document font subsets.

Although not so limited, the embodiments described herein primarily refer to improving the document loading time for a web browser. However, it should be appreciated that the embodiments described herein may be applied to any suitable document viewer that is capable of loading and displaying a document transmitted over a network. Another example of such a document viewer is a Portable Document Format ("PDF") reader.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
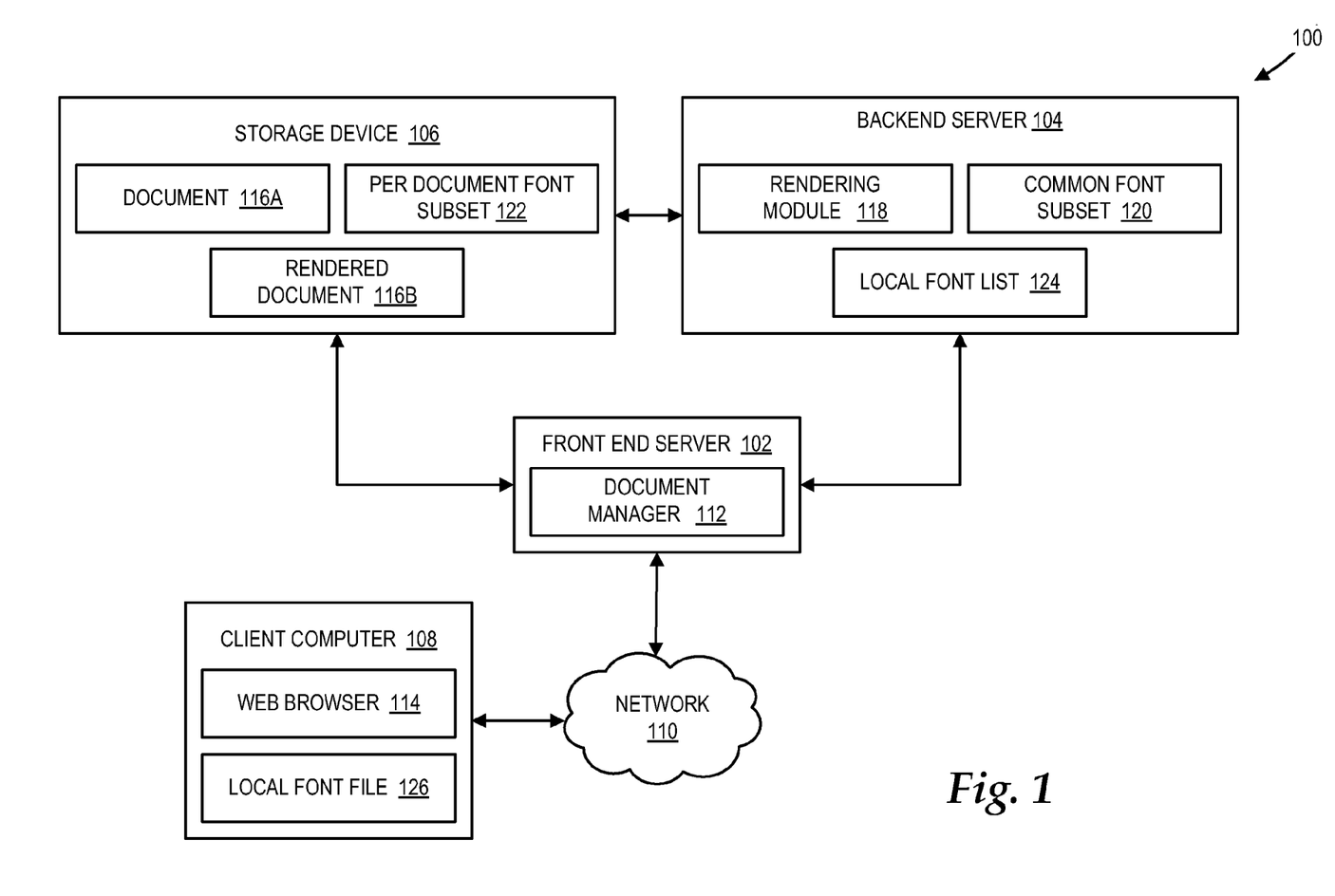
FIG. 1 is a block diagram showing an illustrative system architecture operative to render and display documents through the web, in accordance with embodiments.

In the following detailed description, references are made to the accompanying drawings that form a part hereof, and which are shown by way of illustration, specific embodiments, or examples. Referring now to the drawings, in which like numerals represent like elements through the several figures, concepts and technologies for providing improved font handling for viewing documents on the web will be described. In particular, FIG. 1 is a block diagram showing a system architecture 100 operative to render and display documents through the web. The architecture 100 includes a front end server 102, a backend server 104, a storage device 106, and a client computer 108. The front end server 102 may communicate with the client computer 108 via a network 110, such as the Internet.

According to embodiments, the front end server 102 includes a document manager 112, which is operative to receive a document request from a web browser 114. For example, the document manager 112 may receive a request for a document 116A or a portion of the document 116A. The document 116A may be word processing document, a spreadsheet, a presentation, or other type of document. The document request may be a Hypertext Transfer Protocol ("HTTP") message.

Upon receiving the document request from the web browser 114, the document manager 112 may request, from a rendering module 118, a rendered representation of the requested document 116A. As illustrated in FIG. 1, the rendered representation of the document 116A is a rendered document 116B, which is a full-fidelity representation of the corresponding document 116A. The full-fidelity representation contains the same features (e.g., layout, resolution, content, etc.) found in the original representation. Thus, a user can expect the same experience viewing a given document whether the document is viewed through a productivity application program or through a web browser, such as the web browser 114. The full-fidelity representation can be contrasted against a lower-fidelity representation in which, for example, the layout may be changed or the resolution and content may be reduced.

Upon receiving the request for a rendered representation of the document 116A, the rendering module 118 retrieves the document 116A from the storage device 106. The rendering module 118 then renders the document 116A into the rendered document 116B, including text, images, and other multimedia. The rendering module 118 may then transmit the rendered document 116B to the document manager 112 and store the rendered document 116B in the storage device 106. In this way, the document manager 112 can fulfill subsequent requests for a rendered representation of the document 116A by retrieving the rendered document 1 16B from the storage device 106, rather than accessing the rendering module 118.

According to embodiments, the rendering module 118 also generates, as necessary, server-generated font files, such as a per document font subset 122. The rendering module 118 may store the per document font subset 122 in the storage device 106. In addition to the server-generated font files, the backend server 104 may include pre-generated font files, such as a common font subset 120. According to embodiments, the common font subset 120 may be generated at build time instead of at run time like the per document font subset 122. The server-generated font files and the pre-generated font files may be collectively referred to herein as server font files. As illustrated in the example of FIG. 1, the backend server 104 may also maintain a local font list 124. The creation, content, and application of the common font subset 120, the per document font subset 122, and the local font list 124 are described in greater detail below with respect to FIGS. 2-4.

After the rendered document 116B and the server-generated font files have been generated and stored in the storage device 106, the document manager 112 may provide the rendered document 116B to the web browser 114, which is operative to display the rendered document 116B. When an initial request is received for the document 116A, the document manager 112 may transmit the rendered document 116B, as generated by the rendering module 118, to the web browser 114. The rendered document 116B is also stored in the storage device 106. Thus, when subsequent requests are received for a rendered representation of the document 116A, the document manager 112 can retrieve the rendered document 116B from the storage device 106 without the need to access the rendering module 118 on the backend server 104.

In order for the web browser 114 to display the fonts utilized in the rendered document 116B, the document manager 112 may further provide the server font files to the web browser 114. In addition, the web browser 114 may request the server font files, as necessary, from the document manager 112. In some embodiments, the web browser 114 may utilize the server font files provided by the document manager 112 to display the rendered document 116B. In other embodiments, the web browser 114 may utilize local font files, such as a local font file 126, to display the rendered document 116B. The creation, content, and application of the local font file 126 is described in greater detail below with respect to FIG. 2-4.

Figure 2:
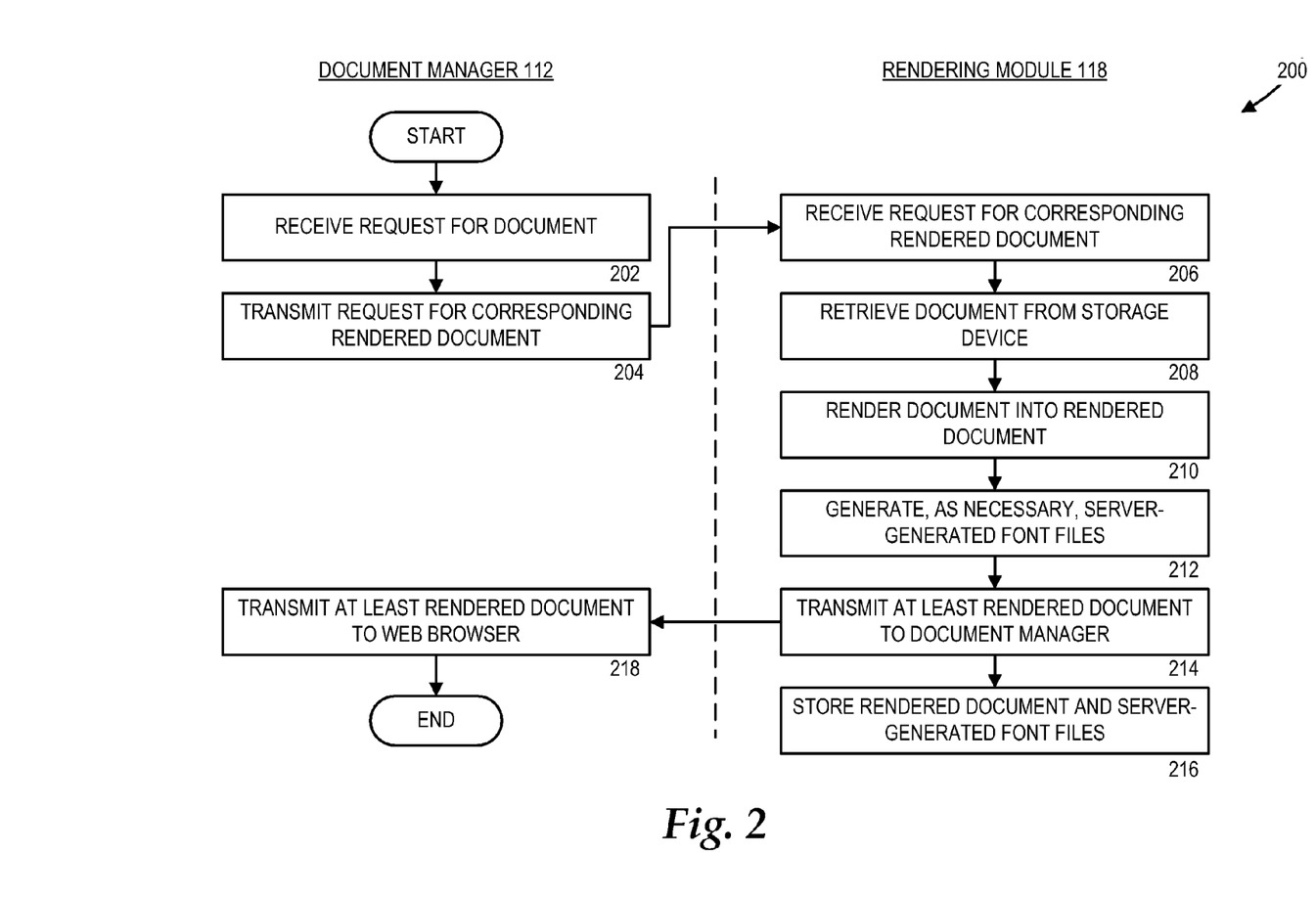
FIG. 2 is a flow diagram showing an illustrative process for providing improved font handling for viewing documents on the web, in accordance with embodiments.
Figure 3A:
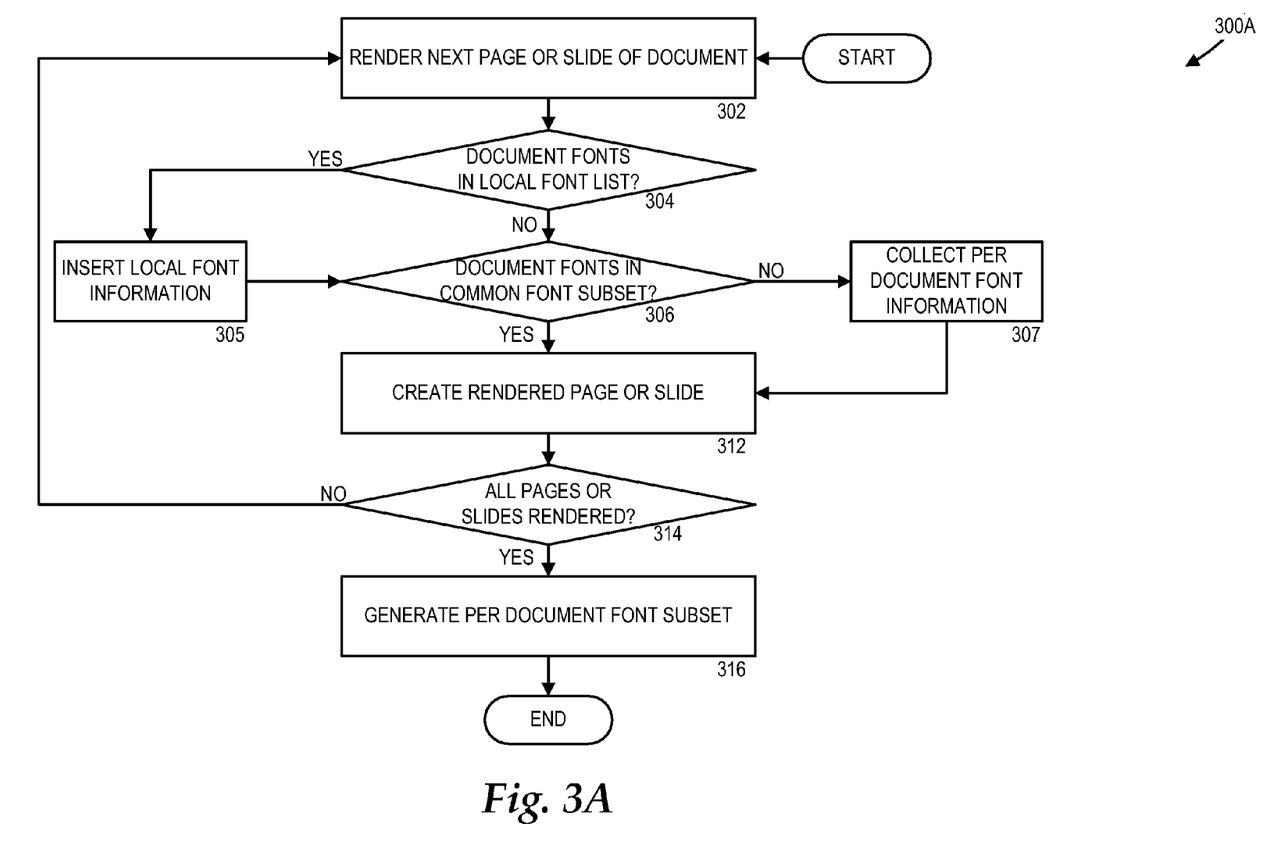
FIG. 3A-3C are flow diagrams showing illustrative operations of the rendering module of FIG. 1, in accordance with embodiments.
Figure 3B:
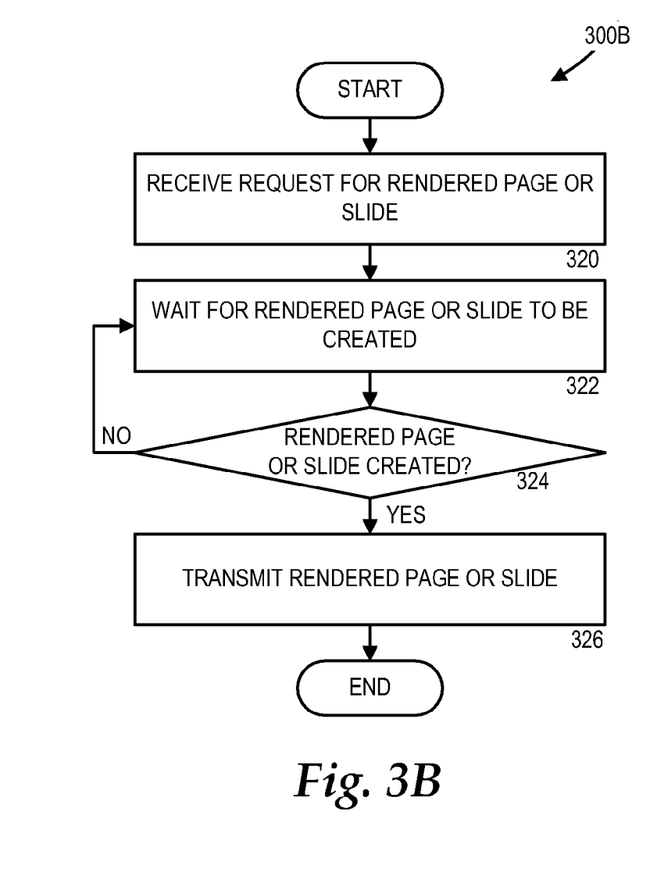
Figure 3C:
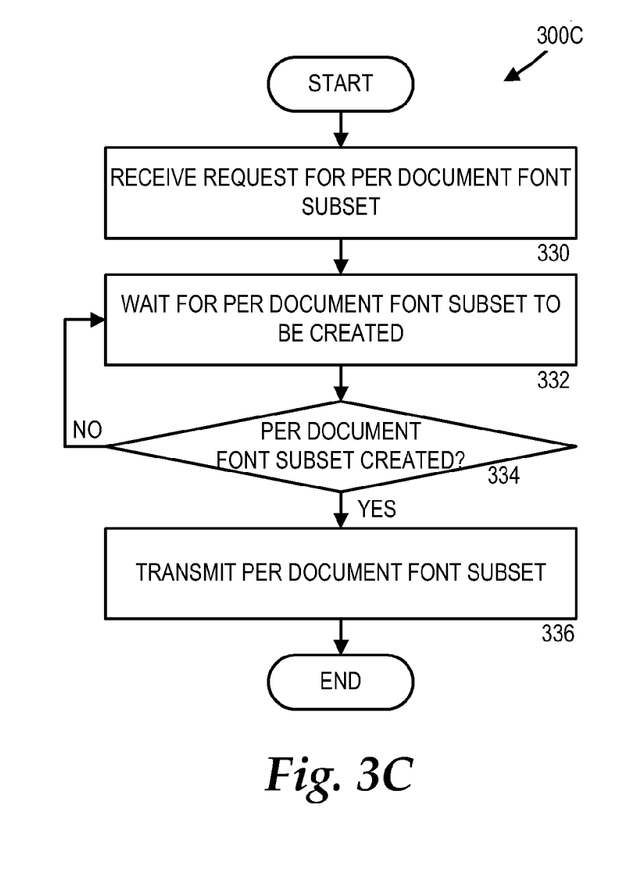
Figure 4:
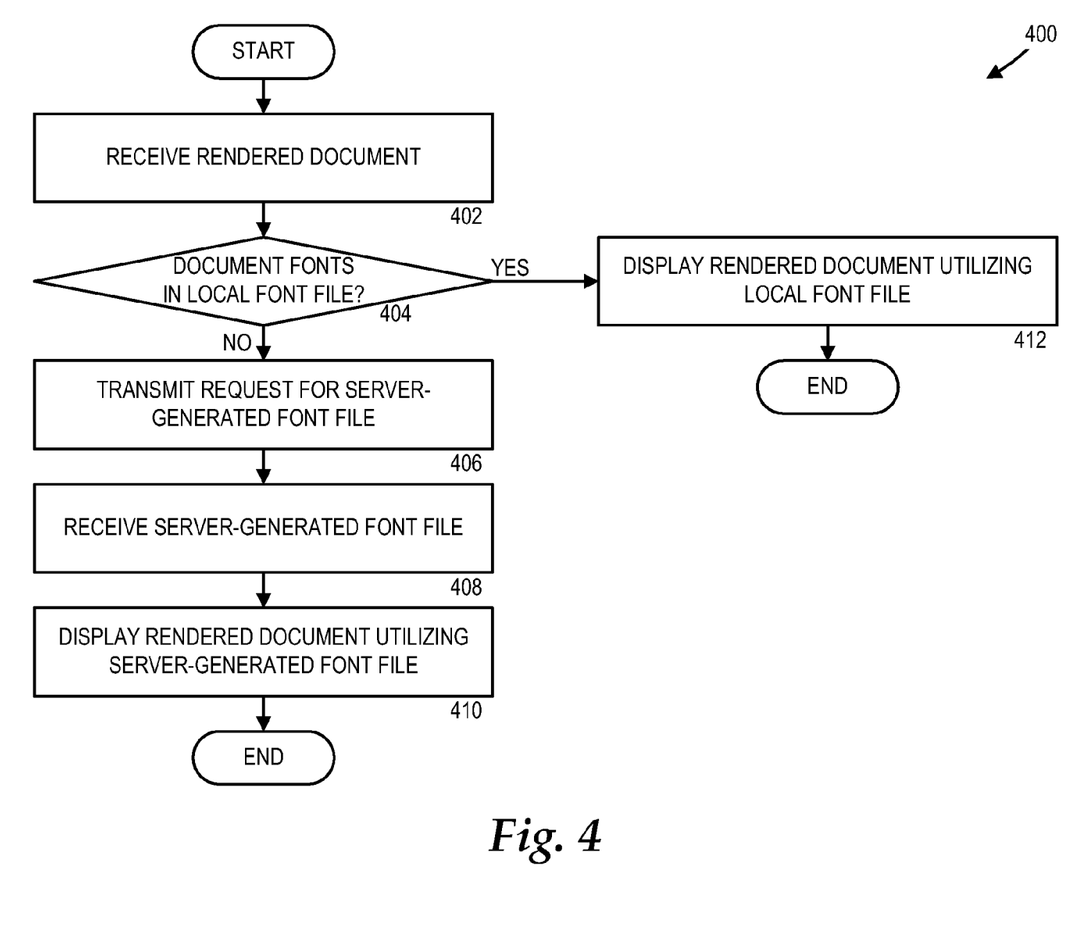
FIG. 4 is a flow diagram showing an illustrative operation of the web browser of FIG. 1, in accordance with embodiments.

Referring now to FIGS. 2-4, additional details will be provided regarding the embodiments presented herein for providing improved font handling for viewing documents on the web. In particular, FIG. 2 is a flow diagram showing an illustrative process for providing improved font handling for viewing documents on the web. FIG. 3A-3C are flow diagrams showing illustrative operations of the rendering module 118. FIG. 4 is a flow diagram showing an illustrative operation of the web browser 114.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring now to FIG. 2, a routine 200 begins at operation 202, where the document manager 112 receives, from the web browser 114, a request for a document, such as the document 116A. The routine 200 then proceeds to operation 204, where the document manager 112 transmits a request for a rendered document that corresponds to the requested document 116A. In this case, the rendered document 116B corresponds to the document 116A. Once the document manager 112 transmits the request for the rendered document 116B to the rendering module 118, the routine 200 proceeds to operation 206.

At operation 206, the rendering module 118 receives, from the document manager 112, the request for the rendered document 116B. The routine 200 then proceeds to operations 208 and 210, where, upon receiving the request for the rendered document 116B, the rendering module 118 retrieves, from the storage device 106, the document 116A and renders (i.e., converts, transforms) the document 116A into the rendered document 116B. By rendering the document 116A into the rendered document 116B, the rendering module 118 may convert the text, images, and other multimedia contained in the document 116A from a first format into a second format that is a full-fidelity representation of the document 116A. In some embodiments, the text, images, and/or other multimedia may be stored in separate files, although they are part of a single document.

In an illustrative example, the first format may be compatible with an authoring software application, such as a word processing application, a presentation application, a spreadsheet application, and the like. The second format may be compatible with the web browser 114. Example formats that are compatible with the web browser 114 may include an image format (e.g., Portable Network Graphics ("PNG"), Joint Photographic Experts Group ("JPEG"), etc.), MICROSOFT SILVERLIGHT, ADOBE FLASH, and the like. According to some embodiments, the text contained in the rendered document 116B may be formatted in Extensible Application Markup Language ("XAML") code. The XAML code may also include local font information, as described in greater detail below. Once the rendering module 118 renders the document 116A into the rendered document 116B, the routine 200 proceeds to operation 212.

At operation 212, the rendering module 118 generates, as necessary, server-generated font files, such as the per document font subset 122. The per document font subset 122 is a document-specific font file containing at least fonts and characters not found in the common font subset 120. The common font subset 120 is a font file containing the most commonly-used fonts and characters. The common font subset 120 is document-independent and may be utilized across multiple documents. According to embodiments, the common font subset 120 is generated in advance at build time, whereas the per document font subset 122 is generated at run time by analyzing the entire rendered document 116B.

In the common font subset 120 and the per document font subset 122, any font layout information may be removed, thereby further reducing the size of the common font subset 120 and the per document font subset 122. In particular, conventional font files include layout information indicating the position of characters, the size of each character, the spacing between characters, and the like. In the architecture 100, the text contained in the rendered document 116B is absolutely positioned text due to the nature of the rendering process. Because the text is absolutely positioned within the rendered document 116B, it follows that the layout information in conventional font files becomes unnecessary. Once the rendering module 118 generates, as necessary, the server-generated font files, the routine 200 proceeds to operation 214.

At operation 214, the rendering module 118 transmits the rendered document 116B to the document manager 112. The routine 200 then proceeds to operations 216 and 218. At operation 216, the rendering module 118 stores the rendered document 116B and any server-generated font files in the storage device 106. In this way, the document manager 112 can fulfill additional requests for the document 116A by retrieving the corresponding rendered document 116B from the storage device 106, rather than accessing the rendering module 118. At operation 218, the document manager 112 transmits at least the rendered document 116B to the web browser 114. The web browser 114 may then display the rendered document 116B.

In some embodiments, the document manager 112 also transmits one or more the server font files, such as the common font subset 120 and the per document font subset 122, to the web browser 114 along with the rendered document 116B. In other embodiments, the document manager 112 may transmit one or more server font files to the web browser 114 in response to a request from the web browser 114.

Referring now to FIGS. 3A-3C, additional details regarding the operation of the rendering module 118 will be described in accordance with embodiments. In particular, in FIG. 3A, a routine 300A shows an illustrative operation of the rendering module 118 where the rendering module 118 incrementally renders (i.e., renders by individual page or slide) the document 116A. As illustrated in FIG. 3A, the routine 300A begins at operation 302, where the rendering module 118 renders the next page or slide in the document 116A into a corresponding page or slide in the rendered document 116B. This corresponding page or slide in the rendered document 116B may be referred to herein as the rendered page or slide. The rendering module 118 may begin the rendering process on the first page or slide in the document 116A. However, the rendering module 118 may also traverse the pages and slides in other suitable orders. Once the rendering module 118 has rendered the page or slide in the document 116A into the rendered page or slide, the routine 300A proceeds to operation 304.

At operation 304, the rendering module 118 determines whether the fonts utilized in the rendered page or slide are contained on the local font list 124. According to embodiments, the local font list 124 contains a list of local fonts that are anticipated to be on or might be on the client computer 108. For example, the local font list 124 may include at least Times New Roman and Arial fonts, as well as the letters A through Z and the numbers 0 through 9. The local font list 124 may further include character ranges in order to accommodate different versions of the same font (e.g., the Arial font on one operating system may be different from the Arial font on another operating system). These local fonts may be contained in authoring software applications, such as word processing applications, spreadsheet applications, presentation applications, and the like, installed on the client computer 108. The local font list 124 may be determined by identifying the software applications installed on the client computer 108 and by populating the local font list 124 with fonts that are typically included in the identified software applications. It should be appreciated that the local font list 124 may be pre-generated prior to run time where documents are requested by web browsers and other software applications.

If the rendering module 118 determines that the fonts utilized in the rendered page or slide are contained on the local font list 124, then the routine 300A proceeds to operation 305, where the rendering module 118 inserts local font information, such as the information contained on the local font list 124, into the rendered page or slide. For example, the local font information may be inserted into the XAML code. The routine then proceeds to operation 306. If the rendering module 118 determines that the fonts utilized in the rendered page or slide are not contained in the local font list 124, then the routine 300A also proceeds to operation 306.

At operation 306, the rendering module 118 determines whether the fonts utilized in the rendered page or slide are contained in the common font subset 120. As previously described, the common font subset 120 is a font file containing the most commonly-used fonts and characters. These commonly-used fonts and characters may be determined by analyzing existing documents in order to determine which fonts and characters appear in the highest frequency across the documents. For example, the common font subset 120 may include at least Times New Roman and Arial fonts, as well as the letters A through Z and the numbers 0 through 9. The common font subset 120 may further include character ranges in order to accommodate different versions of the same font. Other suitable techniques for determining commonly-used fonts and characters may be similarly utilized.

If the rendering module 118 determines that the fonts utilized in the rendered page or slide are not contained in (i.e., missing from) the common font subset 120, then the routine 300A proceeds to operation 307, where the rendering module 118 collects per document font information, which is later utilized by the rendering module 118 to generate the per document font subset 122. For example, the rendering module 118 may analyze the entire rendered document 116B (i.e., all of the pages or slides of the rendered document 116B) to determine which fonts are necessary for the web browser 114 to display the rendered document 116B. These fonts may be included in the per document font information. Once the rendering module 118 collects the per document font information, the routine 300A proceeds to operation 312. Further, if the rendering module 118 determines that the fonts utilized in the rendered page or slide are contained in the common font subset 120, then the routine 300A also proceeds to operation 312.

At operation 312, the rendering module 118 creates the rendered page or slide, which may later be transmitted to the document manager 112. The document manager 112 can then provide the rendered page or slide to the web browser 114 for display. At that time, the document manager 112 may also provide the common font subset 120, along with the rendered page or slide, to the web browser 114. In the alternative, the document manager 112 may transmit the common font subset 120 to the web browser 114 in response to receiving a request from the web browser 114. For example, the web browser 114 may transmit a request for the common font subset 120 to the document manager 112 if the common font subset 120 is not stored in the web browser's cache.

Once the rendering module 118 has created the rendered page or slide, the routine 300A proceeds to operation 314, where the rendering module 118 determines whether there are any additional pages or slides in the document 116A to render into corresponding pages or slides of the rendered document 116B. If the rendering module 118 determines that there are additional pages or slides in the document 116A to render, then the routine 300A proceeds to operation 302, where the rendering module 118 renders the next page or slide in the document 116A. The routine 300A then continues as previously described. If the rendering module 118 determines that there are no additional pages or slides in the document 116A to render, the routine 300A proceeds to operation 316.

At operation 316, the rendering module 118 generates the per document font subset 122 based on the per document font information that was collected at operation 307. In particular, the per document font subset 122 may include at least those fonts that are necessary for the web browser 114 to display the rendered document 116B. Thus, the per document font subset 122 may include fonts that are specific to the rendered document 116B. The per document font subset 122 may or may not contain fonts that are included in the common font subset 120 and the local font file 126. It should be appreciated that the per document font subset 122 may be generated at various other points within the routine 300A.

In FIG. 3B, a routine 300B shows an illustrative operation of the rendering module 118 where the rendering module 118 responds to a request for one or more rendered pages or slides. The routine 300B begins at operation 320, where the rendering module 118 receives, from the document manager 112, a request for a particular rendered page or slide. The routine 300B then proceeds to operation 322, where the rendering module 118 waits for the rendered page or slide to be created according to the routine 300A, as previously described.

At operation 324, the rendering module 118 continues to wait until the rendered page or slide has been created. If, at operation 324, the rendering module 118 determines that the rendered page or slide has been created, then the routine 300B proceeds to operation 326. At operation 326, the rendering module 118 transmits the rendered page or slide to the document manager 112.

In FIG. 3C, a routine 300C shows an illustrative operation of the rendering module 118 where the rendering module 118 responds to a request for the per document font subset 122. The routine 300C begins at operation 330, where the rendering module 118 receives, from the document manager 112, a request for the per document font subset 122. The routine 300C then proceeds to operation 332, where the rendering module 118 waits for the per document font subset 122 to be created according to the routine 300A, as previously described.

At operation 334, the rendering module 118 continues to wait until the per document font subset 122 has been created. If, at operation 334, the rendering module 118 determines that the per document font subset 122 has been created, then the routine 300C proceeds to operation 336. At operation 336, the rendering module 118 transmits the per document font subset 122 to the document manager 112.

Upon receiving the rendered page or slide, the document manager 112 can then provide the rendered page or slide to the web browser 114 for display. The web browser 114 may attempt to utilize local font files, such as the local font file 126, to display the rendered document 116B. For example, the web browser 114 may attempt to utilize the local font files as specified by the local font information that was inserted into the rendered page or slide. If the web browser 114 cannot utilize the local font files to display the rendered document 116B, then the document manager 112 may receive, from the web browser 114, a request for one or more server font files, such as the common font subset 120 and the per document font subset 122. In response to receiving the request for server font files, the document manager 112 may transmit the requested server font files to the web browser 114, in order to display the rendered document 116B.

According to embodiments, the per document font subset 122 or the common font subset 120 may be transmitted to the web browser 114 if local font files, such as the local font file 126, are not available. For example, the client computer 108 may execute a client-side process (not shown) that is operative to determine whether the local font file 126 can be utilized to display the rendered document 116B. If the client-side process determines that the local font file 126 cannot be utilized to display the rendered document 116B, then the web browser 114 may transmit an additional request to the document manager 112 for the per document font subset 122 or the common font subset 120. In response to receiving the request for the per document font subset 122 or the common font subset 120 from the web browser 114, the document manager 112 may transmit the per document font subset 122 or the common font subset 120 to the web browser 114. In this case, the web browser 114 may utilize the per document font subset 122 or the common font subset 120 to display the rendered document 116B.

Referring now to FIG. 4, additional details regarding the operation of the web browser 114 will be described in accordance with embodiments. In particular, a routine 400 shows an illustrative operation of the web browser 114 upon receiving at least a portion of the rendered document 116B. As illustrated in FIG. 4, the routine 400 begins at operation 402, where the web browser 114 receives at least at portion of the rendered document 116B from the document manager 112. In particular, the web browser 114 may receive the entire rendered document 116B or a particular page or slide from the rendered document 116B. Once the rendered document 116B receives the rendered document 116B, the routine 400 proceeds to operation 404.

At operation 404, the web browser 114 determines whether the local font files, such as the local font file 126, contains the fonts necessary to display the rendered document 11 6B in its full-fidelity. Instructions guiding the web browser 114 to search for and utilize the local font file 126, as well as the common font subset 120 and the per document font subset 122, may be contained in the XAML code in the rendered document 116B. The local font file 126 may be part of an authoring software application installed on the client computer 108. If the web browser determines that the local font file 126 contains the fonts necessary to display the rendered document 116B in its full-fidelity, then the routine 400 proceeds to operation 412, where the web browser 114 displays the rendered document 116B utilizing the local font file 126.

If the web browser 114 determines that the local font file 126 does not contain the fonts necessary to display the rendered document 116B in its full-fidelity, then the routine 400 proceeds to operation 406, where the web browser 114 transmits a request for one or more appropriate server font files, such as the common font subset 120 and the per document font subset 122, to the document manager 112. The document manager 112 may then retrieve the appropriate server font files and transmit the server font files to the web browser 114. Once the web browser 114 transmits the request for appropriate server font files to the document manager 112, the routine 400 proceeds to operation 408. At operation 408, the web browser 114 receives the appropriate server font files from the document manager 112. The routine 400 then proceeds to operation 410, where the web browser 114 displays the rendered document 116B utilizing the server font files.

Figure 5:
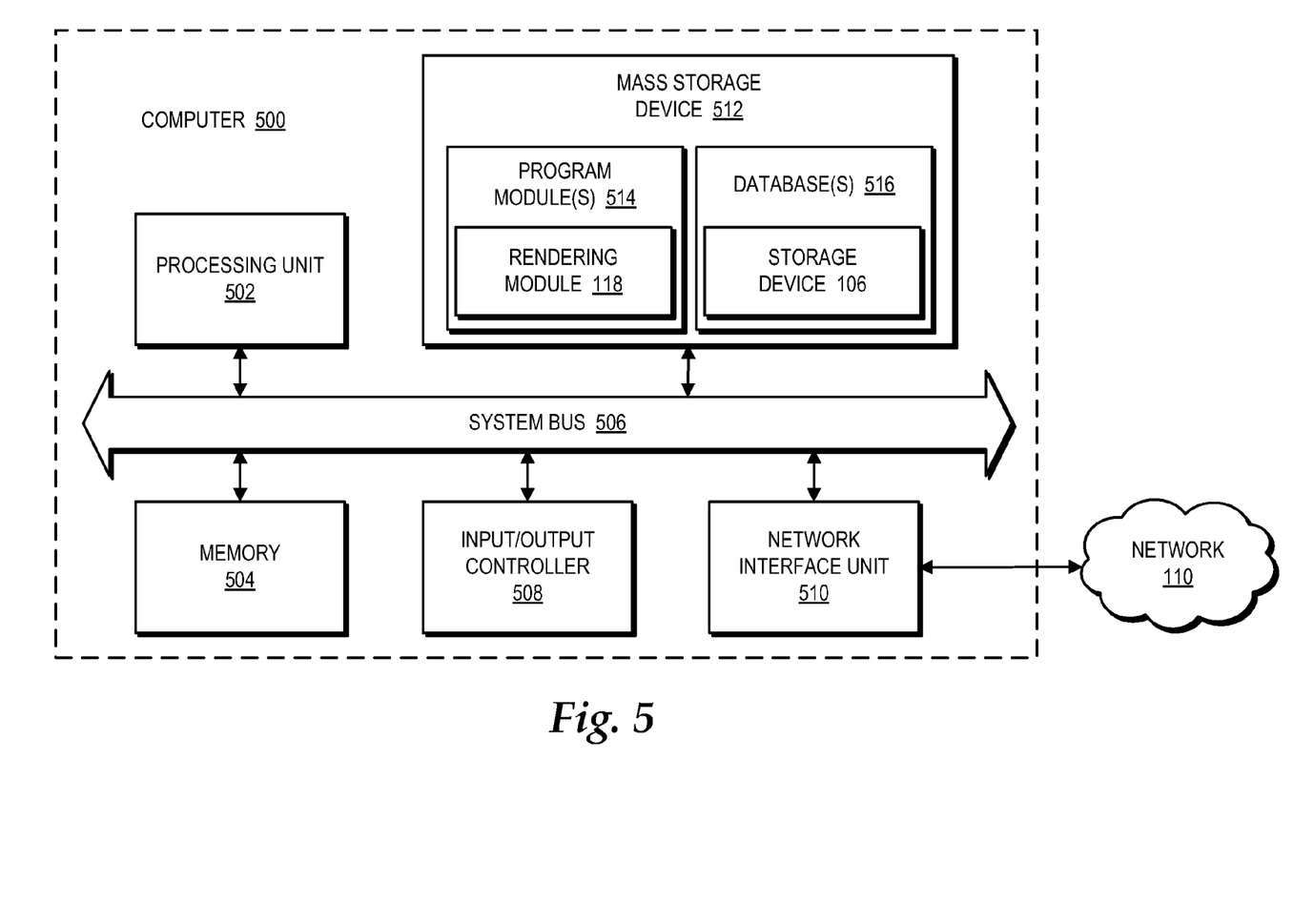
FIG. 5 is a computer architecture diagram showing an illustrative computer hardware architecture for a computing system capable of implementing the embodiments presented herein.

Referring now to FIG. 5, an exemplary computer architecture diagram showing a computer 500 is illustrated. The computer 500 includes a processing unit 502 ("CPU"), a system memory 504, and a system bus 506 that couples the memory 504 to the CPU 502. The computer 500 further includes a mass storage device 512 for storing one or more program modules 514, such as the rendering module 118, and one or more databases 516, such as the storage device 106. Other program modules 514 may include the web browser 114 and the document manager 112. The mass storage device 512 is connected to the CPU 502 through a mass storage controller (not shown) connected to the bus 506. The mass storage device 512 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network, such as the network 110. The computer 500 may connect to the network 110 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. Similarly, the input/output controller 508 may provide output to a display or other type of output device (not shown).

Based on the foregoing, it should be appreciated that technologies for providing improved font handling for viewing documents on the web are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing font files to a document viewer operating on a client computer, the method comprising computer-implemented operations for:
   receiving a request for a rendered document in a second file format corresponding to a document in a first file format;
   retrieving the document from a storage device;
   transforming the document in the first file format into the rendered document in the second file format;
   generating one or more server font files for displaying the rendered document, the rendered document having a same layout and a same resolution as the document in the first file format, and containing text being absolutely positioned text within the rendered document, the server font files including
    a common font subset comprising a font file containing the most commonly-used fonts and characters across multiple documents and
    a per document font subset comprising a font file containing fonts missing from the common font subset;
updating the one or more server font files by removing font layout information including a position of characters, a size of characters and a spacing between characters, from the common font subset and the per document font subset; and
storing the rendered document and the updated one or more server font files.

2. The computer-implemented method of claim 1, the method further comprising computer-implemented operations for transmitting the rendered document and the server font files to the document viewer, the document viewer operative to display the rendered document utilizing the server font files.

3. The computer-implemented method of claim 1, wherein the rendered document in the second file format comprises a full-fidelity representation of the document in the first file format.

4. The computer-implemented method of claim 1, wherein transforming the document into the rendered document comprises:
    transforming a page or slide of the document into a page or slide of the rendered document;
    providing the rendered document to the document viewer for display; and
    upon providing the rendered document to the document viewer for display, transforming a next page slide of the document into a next page or slide of the rendered document.

5. The computer-implemented method of claim 1, further comprises:
    determining whether fonts utilized in the rendered document are contained in a local font list, the local font list containing a list of font files that are anticipated to be stored on the client computer; and
    in response to determining that the fonts utilized in the rendered document are contained in the local font list, inserting local font information contained on the local font list into the rendered document.

6. The computer-implemented method of claim 5, further comprises:
    determining whether the fonts utilized in the rendered document are contained in the common font subset.

7. The computer-implemented method of claim 6, further comprises:
    in response to determining that the fonts utilized in the rendered document are not contained in the common font subset, generating the per document font subset.

8. A computer system comprising:
a processor;
a memory operatively coupled to the processor; and
a program module (i) which executes in the processor from the memory and (ii) which, when executed by the processor, causes the computer system to provide font files to a document viewer operating on a client computer by
    receiving, from the document viewer, a request for a rendered document in a second format corresponding to a document in a first file format,
    retrieving the document from a storage device,
    transforming the document in the first file format into the rendered document in the second file format, the rendered document adapted to provide a full-fidelity representation of the document through the document viewer, the full-fidelity representation of the document having a same layout and a same resolution as the document in the first file format, and containing text being absolutely positioned text within full-fidelity representation of the document,
    storing the rendered document in the storage device,
    determining whether fonts utilized in the rendered document are contained in a local font list,
    in response to determining that the fonts utilized in the rendered document are contained in the local font list, inserting local font information contained on the local font list into the rendered document,
    upon inserting the local font information contained in the local font list into the rendered document, transmitting the rendered document to the document viewer, the document viewer operative to display the rendered document utilizing one or more local font files on the client computer,
    determining whether the fonts utilized in the rendered document are contained in a common font subset, the common font subset comprising a font file containing the most commonly-used fonts and characters across multiple documents,
    determining whether the fonts utilized in the rendered document are not contained in the common font subset and generating a per document font subset containing the fonts not contained in the common font subset,
    updating the common font subset and the per document font subset by removing font layout information including a position of characters, a size of characters and a spacing between characters, from the common font subset and the per document font subset, and
    in response to determining that the fonts utilized in the rendered document are contained in the common font subset, determining whether the client computer contains the updated common font subset and the updated per document font subset.

9. The computer system of claim 8, wherein the program module which, when executed by the processor, further causes the computer system to provide font files to the document viewer operating on the client computer by
    in response to determining that the client computer contains the updated common font subset, transmitting the rendered document to the document viewer, the document viewer operative to display the rendered document utilizing the updated common font subset, and
    in response to determining that client computer does not contain the common font subset, transmitting the rendered document and the updated per document subset to the document viewer, the document viewer operative to display the rendered document utilizing the updated per document subset.

10. The computer system of claim 9, wherein the program module which, when executed by the processor, further causes the computer system to provide font files to the document viewer operating on the client computer by
    transmitting the rendered document to the document viewer,
    receiving, from the document viewer, a request for the updated per document font, and
    in response to receiving the request for the updated per document font, transmitting the updated per document font subset to the document viewer, the document viewer operative to display the rendered document utilizing the updated per document font subset.

11. The computer system of claim 8, wherein text contained in the rendered document is formatted in Extensible Application Markup Language (XAML).

12. The computer system of claim 8, wherein the document viewer is operative to search for and utilize the local font files and to determine whether to retrieve additional font files from the storage device.

13. The computer system of claim 8, wherein transforming the document into the rendered document comprises:
 transforming a page or slide of the document into a page or slide of the rendered document;
 providing the page or slide of the rendered document to the document viewer for display; and
 upon providing the page or slide of the rendered document to the document viewer for display, transforming a next page or slide of the document into a next page or slide of the rendered document.

14. One of an optical disk, a magnetic storage device or a solid state storage device having computer-executable instructions stored thereon which, when executed by a computer, cause the computer to:
 (a) receive, from a web browser executed on a client computer, a request for a rendered document corresponding to a document;
 (b) retrieve the document from a storage device;
 (c) transform a next page or slide of the document into a rendered page or slide of the rendered document, the rendered document having a same layout and a same resolution as the document in the first file format, and containing text being absolutely positioned text within the rendered document;
 (d) determine whether fonts utilized in the rendered page or slide of the rendered document are contained in a local font list;
 (e) in response to determining that the fonts utilized in the rendered page or slide are contained in the local font list, insert local font information contained in the local font list into the rendered page or slide;
 (f) upon inserting the local font information contained in the local font list into the rendered page or slide, transmit the rendered page or slide to the web browser, the web browser operative to display the rendered page or slide utilizing one or more local font files on the client computer;
 (g) determine whether the fonts utilized in the rendered page or slide are contained in a common font subset, the common font subset comprising a font file containing the most commonly-used fonts and characters across multiple documents, and determine whether fonts utilized in the rendered page or slide are not contained in the common font subset and generating a per document font subset containing the fonts not contained in the common font subset;
 (h) updating the common font subset and the per document font subset by removing font layout information including a position of characters, a size of characters and a spacing between characters, from the common font subset and the per document font subset;
 (i) in response to determining that the fonts utilized in the rendered page or slide are contained in the common font subset, determine whether the client computer contains the updated common font subset and the updated per document font subset;
 (j) in response to determining that the client computer contains the common font subset, transmit the rendered page or slide to the web browser, the web browser operative to display the rendered page or slide utilizing the common font subset stored on the client computer;
 (k) in response to determining that client computer does not contain the common font subset, transmit the rendered page or slide and the common font subset to the web browser, the web browser operative to display the rendered page or slide utilizing the common font subset; and
 (l) repeat operations (c)-(k) until the document has been rendered into the rendered document.

15. The optical disk, magnetic storage device or solid state storage device of claim 14 having computer-executable instructions stored thereon which, when executed by a computer, further cause the computer to:
 transmit the rendered document to the web browser;
 receive, from the web browser, a request for the updated per document font; and
 in response to receiving the request for the updated per document font, transmit the updated per document font subset to the web browser, the web browser operative to display the rendered document utilizing the updated per document font subset.

* * * * *